United States Patent [19]
Engelbrecht

[11] 3,962,679
[45] June 8, 1976

[54] HANDWRITING IDENTIFICATION TECHNIQUE

[75] Inventor: Rudolf Succo Engelbrecht, Bremgarten, Switzerland

[73] Assignee: RCA Corporation, New York, N.Y.

[22] Filed: June 6, 1974

[21] Appl. No.: 476,898

[52] U.S. Cl. .................. 340/146.3 SY; 178/18; 317/262 A
[51] Int. Cl.² ............................................ G06K 9/00
[58] Field of Search ......... 340/146.3 SY; 73/432 A, 73/432 AD, 432 CR, DIG. 10; 317/235 AJ, 262 A, 262 E, 262 AE; 324/109; 178/18

[56] References Cited
UNITED STATES PATENTS

| | | | |
|---|---|---|---|
| 3,113,461 | 12/1963 | Peters | 340/146.3 SY |
| 3,579,186 | 5/1971 | Johnson et al. | 340/146.3 SY |
| 3,618,019 | 11/1971 | Nemirovsky et al. | 340/146.3 SY |
| 3,699,517 | 10/1972 | Dyche | 340/146.3 SY |

*Primary Examiner*—Leo H. Boudreau
*Attorney, Agent, or Firm*—Edward J. Norton; George J. Seligsohn

[57] ABSTRACT

Handwriting identification technique employing handwriting speed as a discriminant.

7 Claims, 5 Drawing Figures

HANDWRITING IDENTIFICATION SYSTEM

HANDWRITING IDENTIFICATION TECHNIQUE

This invention relates to a handwriting identification technique and, more particularly, to such a technique employing handwriting speed as a discriminant.

Handwriting identification systems, for such uses as identifying signatures, are known in the art, and, by way of example, are disclosed in U.S. Pat. Nos. 3,113,461; 3,480,911; 3,563,097, and 3,621,720. While various types of discriminants are disclosed in these prior art patents, most of these prior art patents employ a signal corresponding to variations in the pressure of a movable element, such as a writing stylus, to manifest given handwriting, such as the signature, of the writer. Identification is achieved by compring predetermined characteristics of this signal, such as is waveform, with an already available corresponding reference signal, which is known to be in the handwriting of the person to be identified.

The handwriting identification system of the present invention differs from those of the prior art primarily in the type of discriminant which is employed. Specifically, in accordance with the present invention, it has been discovered that the derivation of a signal manifesting the speed of a movable element, such as a stylus, with respect to a writing surface provides a discriminant which bears a high correlation with respect to the handwriting of the same person on different occasions and a low correlation with respect to the handwriting of different persons.

This and other features and advantages of the present invention will become more apparent from the following detailed description taken together with the accompanying drawing, in which.

Figure 1:
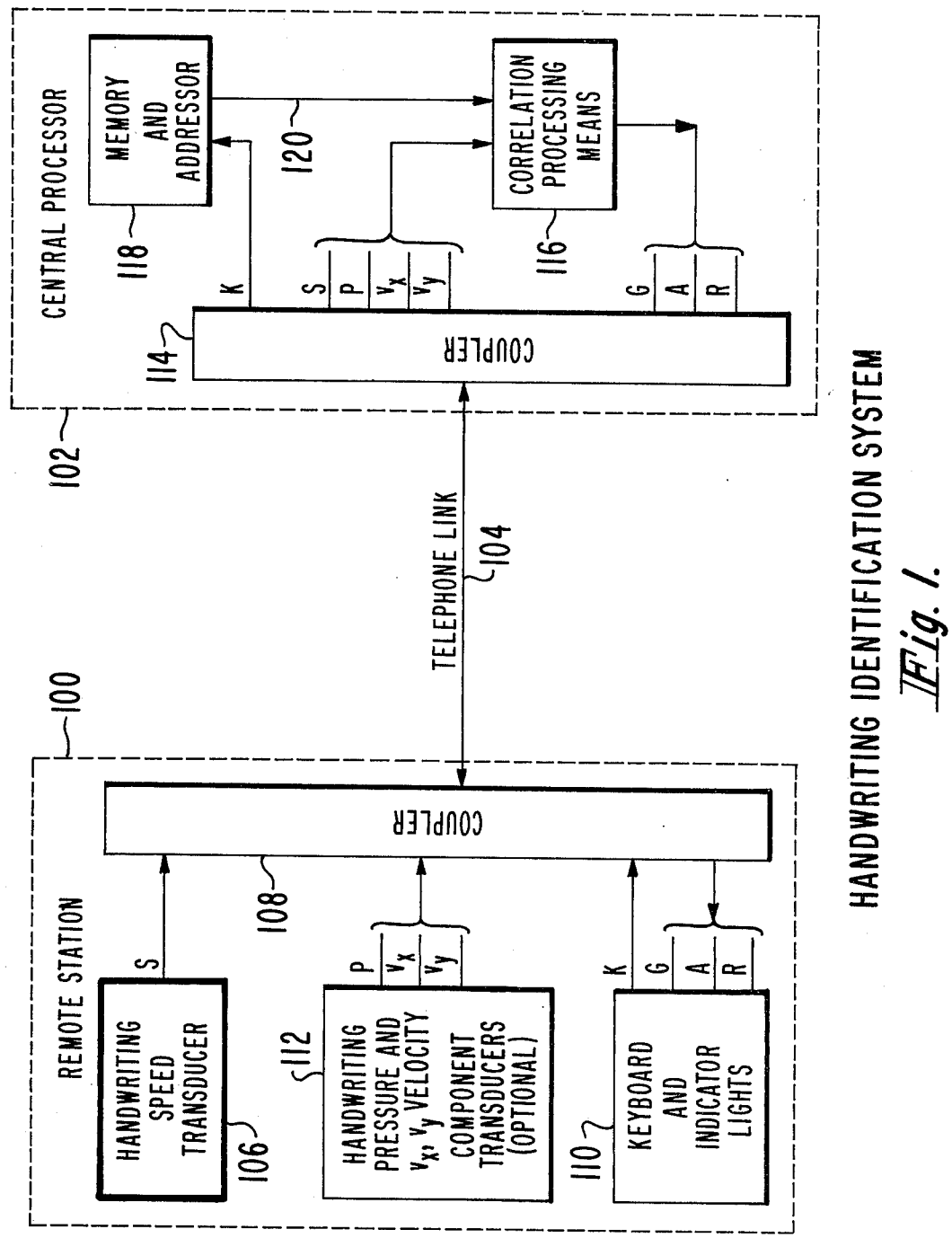
FIG. 1 is a block diagram of an embodiment of a handwriting identification system incorporating the present invention.

The handwriting identification system shown in FIG. 1 comprises one or more remote stations, such as remote station 100, each of which is coupled to a central processor by a telecommunication link, such as a telephone link 104. Rather than a telephone link, the telecommunication link may include a radio link or a private wire link, etc.

Remote station 100 includes handwriting speed transducer 106, which is coupled to telephone link 104 by coupler 108. Coupler 108 also couples keyboard and indicator lights 110 of remote station 100 with telephone link 104. Optionally, remote station 100 may include handwriting pressure and $v_x$, $v_y$ velocity component transducers 112 which are coupled with telephone link 104 by coupler 108.

Central processor 102 includes coupler 114 for coupling telephone link 104 with correlation processing means 116 and memory addressor 118.

In operation, remote station 100 may be a commercial establishment (e.g., store, bank, etc.) accepting credit or other identification cards, each of which is assigned to a unique number. The purpose of such a handwriting identification system is to ascertain that the person presenting the card is the assigned holder thereof.

This is accomplished by using keyboard 110 to generate an address signal K corresponding to the card number of the card then being presented. The address signal K is transmitted through coupler 108, telephone link 104, coupler 114, and then applied as an address input to memory and addressor 118 of central processor 102.

Memory and addressor 118, in response to the address signal K applied as an input thereto, selects from the memory portion of block 118 a reference signal or signals having characteristics corresponding to the handwritten signature of the true holder of the card, and applies the reference signal or reference signals, as the case may be, as input to correlation processing means 116 over connection 120.

Coupler 108, telephone link 104, coupler 114 may cooperate to transmit the address signal K between remote station 100 and central processor 102 by frequency shift keying of two frequencies within a first sub-channel of a telephone bandwidth audio channel, by way of example, as is known in the data communication art. Other respective sub-channels of an audio bandwidth telephone channel may be employed by couplers 108 and 114 for transmitting other respective information signals, discussed below, between remote station 100 and central processor 102 over telephone link 104, as is also known in the data communication art.

Handwriting speed transducer 106 produces an output signal S which, in a manner to be described below, manifests the instantaneous speed of a movable element, such as the point of a writing stylus, with respect to a writing surface. The signal S may, for example, manifest the handwritten signature of the presenter of the card at the remote station. This signal S, after being communicated to central processor 102 through coupler 108, telephone link 104 and coupler 114, is applied to correlation processing means 116 over a conductor included in connection 122.

Correlation processing means 116 employs signal S as a discriminant by comparing it to a corresponding reference signal applied thereto over connection 120. In a manner to be described in more detail below, correlation processing means 116, depending upon the amount of correlation which exists, selectively transmits signal G, signal A, or signal R back to remote station 100 over coupler 114, telephone link 104 and coupler 108 to keyboard and indicator light 110 thereof, to selectively light a green lamp, an amber lamp or a red lamp. The lighting of the green lamp, by the selective transmission of signal G, indicates a high correlation has been achieved so that the presenter of the card has been validated as the true holder thereof. The lighting of the red lamp, in response to the receipt of an R signal, indicates low correlation and invalidates the presenter of the card as the true holder thereof. The lighting of the amber light, by the receipt of an A signal, indicates an intermediate correlation, suggesting that the presenter of the card should again write his signature employing handwriting speed transducer 106; so that it can be rechecked.

The optional use of block 112, with the transmission of a pressure signal P and $v_x$ and $v_y$ velocity component signals to correlation processing means 116 may, if desired, be employed as additional or alternative discriminants in determining the amount of correlation which exists.

It is the use of handwriting speed as a discriminant either alone or in combination with other discriminants, in a handwriting identification system (such as is the handwriting identification system shown in FIG. 1, for example), which forms the subject matter of the present invention.

Reference is made to my copending U.S. Pat. application Ser. No. 451,093, filed March 14, 1974, which issued Mar. 18, 1975 as U.S. Pat. No. 3,872,480, which relates to a method of electrostatic recording on electrically insulating films by non-wetting electrically conductive liquids. More particularly, in accordance with this patent application electrostatic charges are applied to an electrically insulating film with the aid of a pointed or patterned probe wetted with an electrically conductive liquid. The liquid is non-wetting on the film. A source of voltage (20–100 volts ac or dc) is applied between the probe and one major surface of the film; and relative motion is applied between the probe and the other major surface of the film so that the liquid comes into only non-wetting contact with selected areas of the film. The liquid adheres only to the probe and moves therewith.

Figure 2A:
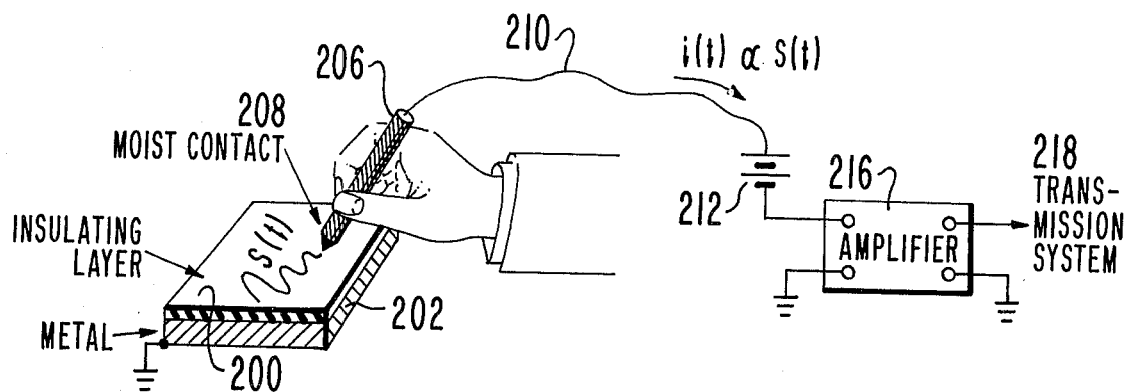
FIGS. 2a and 2b are, respectively, pictorial and schematic illustrations of a preferred embodiment of the handwriting speed transducer shown in FIG. 1.
Figure 2B:
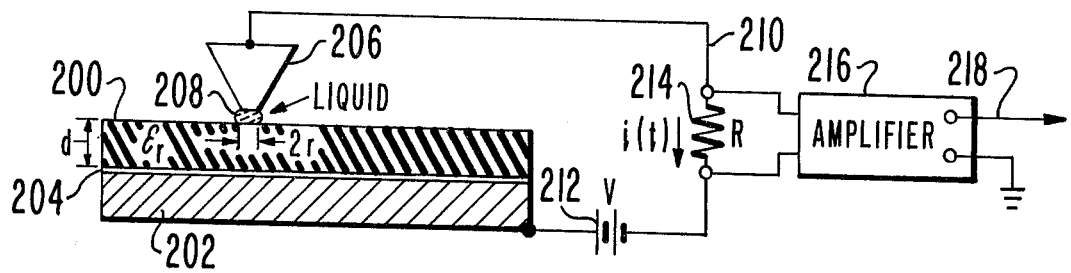

I have now found that such electrostatic recording can be employed as a handwriting speed transducer in a handwitten identification system. In particular, as shown in FIGS. 2a and 2b, the writing surface comprises insulating layer 200, which is disposed on metal backing plate 202. A conductive liquid layer 204 at the interface between insulating layer 200 and backing plate 202 ensures complete electrical contact between the entire upper surface of metal backing plate 202 and the entire lower surface of insulating layer 200. Movable stylus element 206 includes a moist contact 208 comprising a conductive liquid.

As discussed in more detail in my aforesaid U.S. Pat. application Ser. No. 451,093, the insulating layer 200 may comprise a sheet of plastic material, such as acrylic material, polystyrene material, polytetrafluoroethylene material, or polyethyleneterephthalate material, having a thickness of between 10 and 50 micrometers, for example, The conductive liquid layer 204, and the moist contact liquid 208 may comprise such liquids as water, ethanol or methanol, for example. The interface layer 204 may alternatively comprise a sheet of paper or a boltter wetted with the conductive liquid. Moist contact 208 may comprise a relatively pointed wettable member of movable stylus 206 such as an ink recorder pin tip of fiber or felt, for example, depending on a reservoir contained within movable stylus 206 for holding the liquid which moistens contact 208.

Most important, is the fact that insulating layer 200 is made from a material which is not wetted by the liquid moistening contact 208. Therefore, as stylus 206 is moved across the writing surface (upper surface of insulating layer 200) the liquid moistening contact 208 tends to remain on contact 208, moving along with stylus 206, rather than flowing onto the written surface of insulating layer 200. Although not essential to the present invention, it is desirable that the writing performed by stylus 206 form at least a temporarily visible impression, so that the writer can see what he has written.

Electrically, an electrostatic charging circuit, indluding wire 219, d.c. voltage source 212 and input resistance 214 of amplifier 216, is serially connected between moist contact 208 and backing material plate 202, as shown in FIGS. 2a and 2b. Therefore, a stylus 206 is employed to handwrite a piece of information, such as a signature, a charge pattern corresponding to this information is laid down on the upper writing surface of insulating layer 200. The magnitude of this charge pattern for an insulating layer 200 having a given dielectric constant $\epsilon_r$ and a given thickness $d$ and having a given voltage V applied thereacross, is proportional to the area of the writing surface of insulating layer 200 covered by the handwritten item of information. Since, as shown in FIG. 2b, moist contact 208 has a fixed diameter $2r$, the area of the recorded charge pattern laid down is equal to the product of this fixed diameter $2r$ multiplied by the linear extent of the handwritten piece of information written by stylus 206. In other words, the total charge laid down on the writing surface of insulator 200 is proportional to the total linear extent of the handwritten piece of information written with stylus 206. Further, since the magnitude of current is proportional to the first time derivative of electric charge and since speed (the scalar magnitude portion of velocity) is proportional to the first time derivative of linear extent, the magnitude of the charging current which flows in the charging circuit through resistance 214, when an item of handwritten information is being written with stylus 206, is proportional to the instantaneous speed S at which stylus 206 is being moved. Thus, the magnitude of the instantaneous current $i$ through resistance 214 is a measure of the handwriting speed of moist contact 208 of stylus 206 at this instant of time. The quantative definition of the term speed (S), as used herein is $S = \sqrt{(v_x)^2 + (v_y)^2}$, where $v_x$ and $v_y$ are the horizontal and vertical components of the velocity of contact 208 of stylus 206 on the writing surface of insulating layer 200, respectively.

In FIGS. 2a and 2b, amplifier 216 amplifies the signal across input resistance 214 and applies the output therefrom to a transmission system 218, which may be coupler 108 of FIG. 1.

Figure 3:
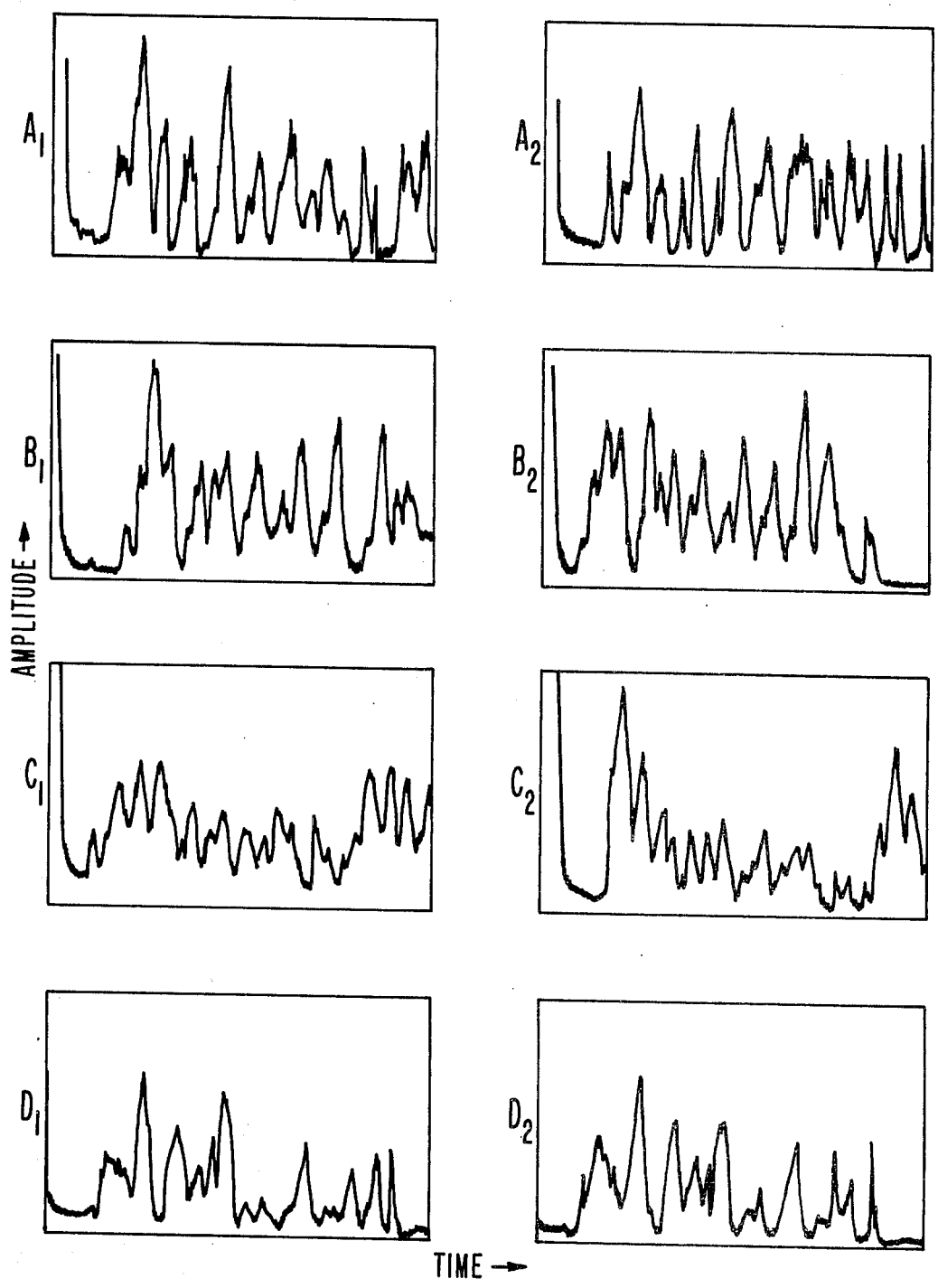
FIG. 3 illustrates a group of waveforms which are helpful in explaining the present invention.

Referring now to FIG. 3, there is shown a group of eight recorded waveforms, each of which was obtained employing a handwriting speed transducer of the type shown in FIGS. 2a and 2b. In particular, waveforms $A_1$ and $A_2$ manifest the handwritten word ZURICH written by individual A at two different times. The same word ZURICH was also handwritten twice by each of three other individuals B, C and D. The corresponding recorded waveforms are $B_1$, $B_2$, $C_1$, $C_2$, $D_1$ and $D_2$, with the letters B, C, D designating the writer and the subscript numbers 1 and 2 designating the order of writing by each writer.

By way of example, a suitable correlation test, which was actually performed on the recorded waveform patterns shown in FIG. 3, consisted of an amplitude comparison of the speed extrema (maxima or minima). Specifically, the extrema of various pairs of the recorded patterns were individually correlated with each other, with an error being indicated by corresponding maxima or minima differing by more than 50% in amplitude from each other. A consecutive group of 26 maxima and minima in each selected pair of patterns were so compared. It was found that when the two recorded patterns of the same writer ($A_1$ and $A_2$; $B_1$ and $B_2$; $C_1$ and $C_2$, or $D_1$ and $D_2$) were compared the total number of errors turned out to be either two or three out of the total of 26 comparisons. However, when pairs of patterns corresponding to different writers were compared ($A_1$ and $B_1$, $A_1$ and $C_2$ etc.) the least number of errors turned out to be six out of a total of 26 comparisons and, in some cases, the number of errors were as much as 13 out of a total of 26 comparisons. Thus, a high correlation exists between the handwriting of a given person at two different times compared to the correlation which exists between the handwriting of two different persons.

Other suitable characteristics may be, alternatively, employed as correlating discriminants. For instance, independent $x$ and $y$ velocity maxima and minima, a temporal sequence of maxima to minima ratios, stylus location (integration of velocity information), stylus acceleration (differentiation of velocity), can be readily extracted from the recorded patterns and processed by detailed correlation tests.

Figure 4:
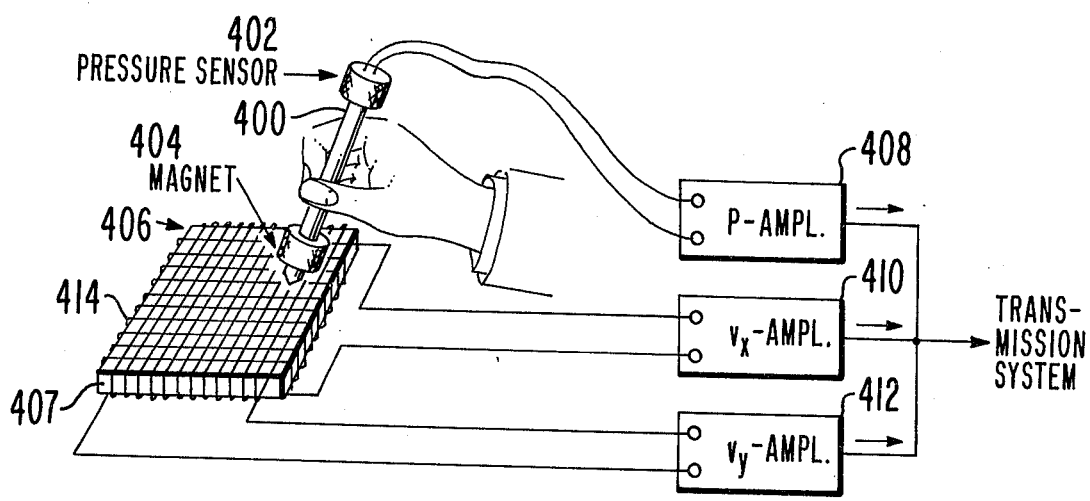
FIG. 4 shows a preferred embodiment of the optional handwriting pressure and $v_x$, $v_y$ velocity component transducers of FIG. 1.

Furthermore, as discussed above in connection with FIG. 1, further confidence may be had by correlating other discriminants, such as handwriting pressure, along with those based on handwriting speed. By way of example, handwriting pressure and $v_x$, $v_y$ velocity component transducers 112 of FIG. 1 may take the form shown in FIG. 4. FIG. 4, shows a writing stylus 400, including pressure sensors 402 having a magnet 404 at its tip. Stylus 400 cooperates with writing surface 406 which includes a pair of $x$ and $y$ conductor coils 414. The output from pressure sensors 402 is applied to a pressure amplifier 408, the output from the $x$ component of velocity is applied to the $v_x$ amplifier 410 and the $y$ component of velocity is applied to the $v_y$ amplifier 412. The outputs from all the amplifiers are coupled to different subchannels of a transmission system 414, which may be coupler 108 of FIG. 1.

The presence of magnet 404, which may be a permanent magnet, results in $x$ and $y$ velocity-component currents being induced in a pair of perpendicular coils 414, wound as shown around a core of ferrous or similar magnetizable material 407 in contact with writing surface 406. At the same time, pressure sensor 402 provides a signal corresponding to the then-existing pressure being exerted to stylus 400. After amplification, by amplifier 408, 410 and 412 the signals may be combined for transmission to the centralized processor.

The arrangement of FIG. 4 may be employed in FIG. 1 in addition to handwriting speed transducer S and, to the extent that it provides velocity component information from which speed can be computed at the central processor, it may be employed alone to provide both handwriting speed information and handwriting pressure information for a handwriting identification system.

What is claimed is:

1. A handwriting identification system comprising a handwriting speed transducer for directly generating a single analog signal proportional to the instantaneous speed of any given handwriting, wherein said speed is a scalar magnitude independent of the direction of said given handwriting at that instant and which has a quantitative value equal to $\sqrt{(v_x)^2+(v_y)^2}$, where $v_x$ and $v_y$ are respectively the horizontal and vertical velocity vectors, wherein said given handwriting includes a plurality of direction components obliquely inclined with respect to the horizontal, vertical and each other, and wherein said transducer incorporates an electrically insulating film writing surface and a movable element for applying electrostatic charges to said surface with a conductive liquid which does not wet said film to produce said given handwriting on said surface with said movable element and provide a single signal proportional to the instantaneous speed of said element with respect to said surface, whereby said single signal may be employed by itself without processing as a discriminant for identifying handwriting.

2. The system defined in claim 1, further including a processor responsive to said signal being applied thereto for employing said signal as a discriminant for identifying said given handwriting, and coupling means coupling said transducer to said processor for applying said signal to said processor.

3. The system defined in claim 2, wherein said processor comprises correlation processing means for correlating given characteristics of said applied signal with corresponding characteristics of a reference signal available to said correlation processing means.

4. The system defined in claim 3, wherein said processor further includes a memory and addressor coupled to said correlation processing means for providing any given one of a plurality of different reference signals from said memory to said correlation processing means in response to the receipt by said addressor of a given address corresponding to that given one of said different reference signals, and keyboard means for supplying said given address to said addressor.

5. The system defined in claim 4, wherein said transducer and said keyboard are located at a remote station from said processor, and wherein said coupling means includes a telecommunication link for sending said signal and said address from said remote station to said processor.

6. The system defined in claim 5, wherein said telecommunication link comprises a telephone link.

7. The system defined in claim 5, wherein said remote station includes an indicator coupled to said processor over said telecommunication link for providing an indication at said remote station related to the amount of correlation which exists between said given handwriting and said given one of said reference signals as determined by said correlation processing means.

* * * * *